(12) United States Patent
Delaporte

(10) Patent No.: US 6,218,937 B1
(45) Date of Patent: Apr. 17, 2001

(54) SYSTEM FOR MONITORING THE PRESSURE OF TIRES

(75) Inventor: Francis Delaporte, Osny (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/573,943

(22) Filed: May 19, 2000

(30) Foreign Application Priority Data

May 20, 1999 (FR) .................................................. 99 06396

(51) Int. Cl.[7] .................................................. B60C 23/00
(52) U.S. Cl. .................. 340/447; 340/449; 340/539; 73/146.4; 73/146.5
(58) Field of Search .................................. 340/442, 447, 340/449, 539; 73/146.4, 146.5

(56) References Cited

U.S. PATENT DOCUMENTS

| | | | |
|---|---|---|---|
| 4,909,074 | * 3/1990 | Gerresheim et al. | 340/442 |
| 4,942,510 | 7/1990 | Edwards | 363/127 |
| 5,231,872 | 8/1993 | Bowler et al. | 73/146.5 |
| 5,708,411 | * 1/1998 | Hill | 340/447 |
| 5,837,891 | * 11/1998 | Bridge | 340/447 |
| 5,900,808 | * 5/1999 | Lebo | 340/442 |
| 6,034,596 | * 3/2000 | Smith et al. | 340/447 |
| 6,148,888 | * 11/2000 | Benimeli | 340/442 |

FOREIGN PATENT DOCUMENTS 0 016 991    10/1980    (EP) .

* cited by examiner

Primary Examiner—Daniel J. Wu
(74) Attorney, Agent, or Firm—Vorys, Sater, Seymour and Pease LLP

(57) ABSTRACT

The system for monitoring the pressure of a tyre of a vehicle wheel comprises a pressure sensor (1), a transmitter (3) for transmitting pressure data and a power-supply battery (10), and a temperature sensor (4) and a processor (2) are also provided, the processor (2) being arranged to control the transmission of the pressure data according to the temperature.

5 Claims, 2 Drawing Sheets

_US 6,218,937 B1_

SYSTEM FOR MONITORING THE PRESSURE OF TIRES

BACKGROUND OF THE INVENTION

A system for monitoring the pressure of a tyre of a vehicle wheel comprises at least - inserted in the wheel rim - a pressure sensor, a transmitter and a battery and a power-supply capacitor for the transmitter.

The system must regularly transmit, to the central computer of the vehicle, bursts of bits of information relating, of course, to the pressure of the tyre but also to, for example, the temperature, the voltage of the power-supply battery and the identity of the wheel.

The system must transmit a specific number Ne, generally five, of identical bursts and a number Nr of these bursts must have been received so that it may be considered that the immediate information has been transmitted and received. The transmission of the bursts can take place, for the sake of providing a basis, every hour if the vehicle is stationary, and every six minutes if the vehicle is moving.

Furthermore, the system is activated at regular intervals, for example, every two seconds, for the transmission of the bursts. Finally, the bursts, each of a duration $t_b$, generally of 8 ms, are spaced, again generally by 12 ms. Thus series of five bursts are transmitted, of a duration of 88 ms over an activation period of 2s.

If it is desired that the system be resistant to very low temperatures, of the order of −40° C., it is necessary to use expensive power-supply batteries, costing around 2 Euros.

The Applicant has sought to overcome this constraint by using inexpensive batteries costing less than 1 Euro but which, consequently, are not made for such low temperatures, such as, for example, recyclable lithium batteries.

SUMMARY OF THE INVENTION

To this end the invention relates to a system for monitoring the pressure of a tyre of a vehicle wheel comprising
  a pressure sensor
  a transmitter for transmitting pressure data,
  a power-supply battery,
characterised in that
  a temperature sensor and
  a processor are also provided, the processor being arranged to control the transmission of the pressure data according to the temperature.

A capacitor is preferably mounted in parallel with the power-supply battery in order to ensure the power supply for the transmitter during the transmission periods and to be recharged outside these transmission periods.

More preferably, the pressure data being transmitted by series of identical bursts and the system being activated at regular intervals, the processor is arranged in order, below a temperature threshold, to spread the transmission of the bursts of a series over a number of activation intervals, advantageously one burst per activation interval.

At low temperatures, the resistance of the battery increases considerably and the spreading of the transmission of the bursts leaves the battery more time between two bursts to recharge the capacitor.

In the preferred embodiment of the system of the invention, the battery, the capacitor, the sensors, the processor and the transmitter are mounted in parallel.

BRIEF DESCRIPTION OF THE DRAWINGS

The invention will be better understood with the aid of the following description of a preferred embodiment of the system for monitoring the pressure of a tyre of the invention, with reference to the attached drawing in which.

DETAILED DESCRIPTION OF THE INVENTION

Figure 1:
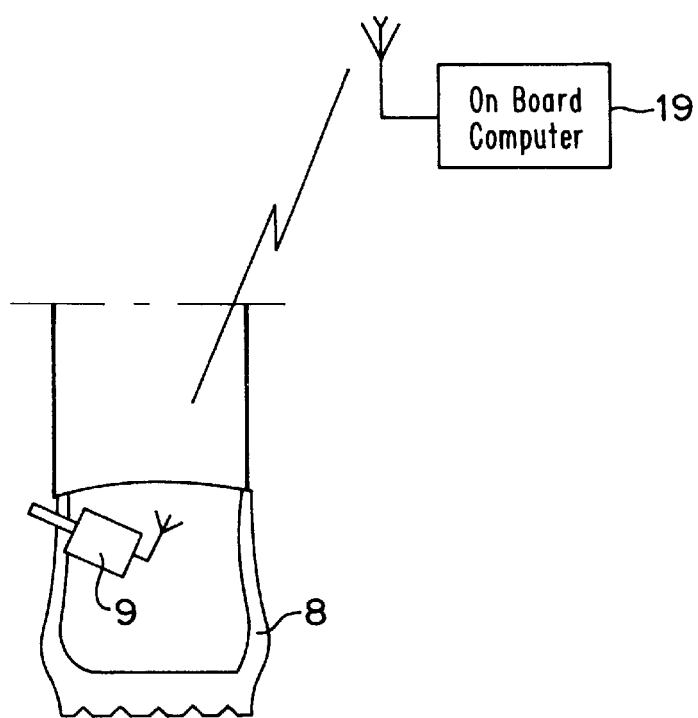
FIG. 1 is a schematic illustration of the pressure monitoring system of the invention, housed in a tyre of an automobile vehicle, of which the on-board computer utilises the pressure measurements.

The pressure monitoring system, bearing the reference 9 in FIG. 1, is mounted inside a tyre 8 of a vehicle wheel, in this case an automobile, and precisely attached to the valve. An on-board computer 19 of the vehicle receives the remote pressure readings transmitted by the system 9 and utilises them to warn the driver of any anomaly.

Figure 2:
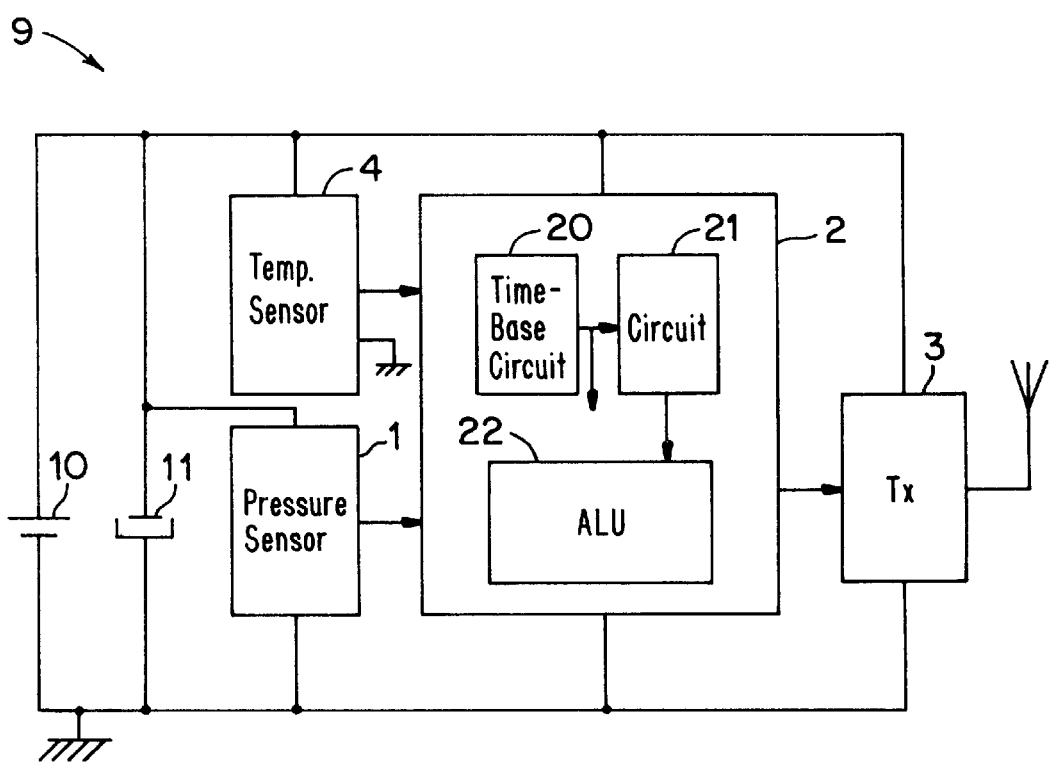
FIG. 2 is a block diagram of the system of FIG. 1, and
  FIGS. 3 and 4 illustrate, over time t, the transmission of bursts of pressure telemetry signals.

As shown in FIG. 2, the system 9 comprises a pressure sensor 1 controlling a wireless transmitter 3, in this case a radio transmitter, via a processor 2 for management of the transmissions of the transmitter 3 to the on-board computer 19. A temperature sensor 4 is connected, at the output, to the processor 2 for management of the transmissions of the transmitter 3. A battery 10, in this case a lithium battery, powers all the circuits 1, 2, 3, 4 which are mounted in parallel between a positive power-supply connection and the earth.

In this example, a capacitor 11 is mounted in parallel with the power-supply battery 10 in order to ensure, in particular, the power supply of the transmitter 3 during the transmission periods and to be recharged outside these transmission periods.

The processor 2 comprises a time base circuit 20 which clocks the operation thereof and, in particular, controls a circuit 21 for placing the other circuits of the processor 2, such as a calculation unit (ALU) 22, on standby or for activating them.

Figures 3, 4:
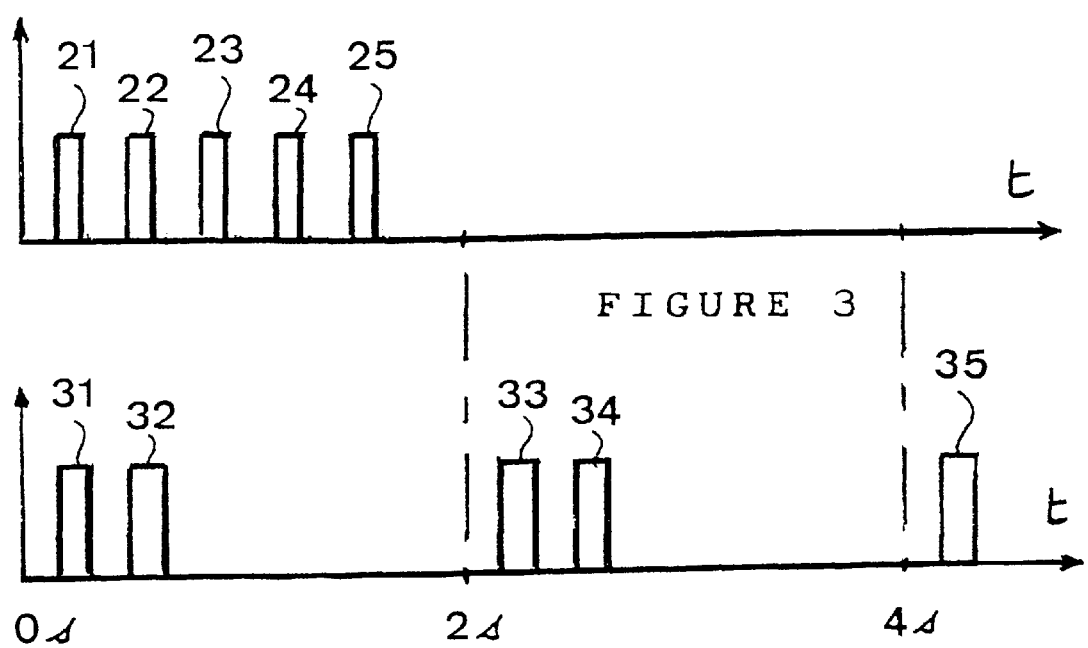

FIGS. 3 and 4 illustrate the operation of the system 9.

The measurements of the pressure sensor 1 are transmitted every six minutes when the wheel is turning and every hour if it is not turning. An inertia sensor, not shown, such as a Reed bulb, controls the processor 2 for this purpose.

This processor operates at an elementary cycle lasting 2 seconds in this case, ie. it is on standby, with low power consumption, most of the time and is switched on and activated at regular intervals every 2 seconds by a timer of the circuit 21 in order to carry out a possible task in the calculation unit 22. The calculation unit 22 stores the moments of the last radio transmissions which it controlled in order to determine, according to the current time, if it must carry out a new transmission of a new series or of a new burst in a series.

A pressure measurement of the sensor 1 is digitised and stored in the processor 2 and transmitted by radio in a series of five identical bursts of pressure data in order to guarantee its transmission. Each burst lasts 8 ms in this case. In standard operation (FIG. 3), above a low threshold, in this case −20° C., the bursts 21, 22, 23, 24, 25 are spaced by 12 ms and all transmitted at the beginning of the same activation period of 2 seconds.

Above −20° C., the battery 10 has an internal resistance limited to several ohms, which makes it possible to supply the transmitter 3 with sufficient power. The reservoir capacitor 11, of some hundreds of μFarads and of some ohms of series resistance, contributes to stabilisation of the supply voltage but thus has only a subsidiary role since the battery 10 is also of low resistance.

On the other hand, if the temperature falls below the −20° C. threshold, the resistance of the battery 10 increases very clearly to reach about a hundred ohms at −40° C. The capacitor 11, on the other hand, substantially retains its characteristics at this temperature.

Below the −20° C. threshold, the series resistance of the battery 10 is too high to provide—at the voltage provided—the current of the transmitter 3 when it is active. However, in order to permit operation of the transmitter, the processor 2 controls the transmission of the pressure data according to the temperature, ie. it spreads the transmissions over time. More precisely, below the threshold of −20° C., it spreads the transmission of the bursts of a series over a number of the 2-second activation intervals.

In this example, this spreading is progressive depending on the fall in the temperature.

In the case of FIG. 4, for which the temperature sensor 4 indicates −30° C., the processor 2 transmits two bursts 31, 32 over a first period, two bursts 33, 34 over the following period and a final burst 35 over the third period, on each occasion storing these elements in order to manage the following ones.

In this example, in the case of a plurality of bursts 31, 32 per period, these bursts have the 12 ms spacing provided.

If the temperature falls to −40° C., for example, the processor 2 slows the average timing of transmission of the bursts 31–35 still further by commanding the transmission of a single burst per activation interval. Below the −20° C. threshold, the capacitor 11 has a principal role in the provision of the electrical power-supply energy, under good conditions of voltage stability, in particular to the transmitter 3 which has a high power consumption when it is transmitting. This provision is actually carried out under low impedance (resistance). The capacitor 11 is partially discharged when the transmitter 3 transmits the data but the transmission of the series of bursts 31–35 is sufficiently spread for the capacitor 11 to be sufficiently recharged by the battery 10 when the transmitter 3 is reactivated. Moreover, provision can also be made so that the periods in which a burst is transmitted are separated by inactive periods. The battery 10—capacitor-integrator 11 assembly, which is rarely solicited as such, can provide an instantaneous high power level equivalent to an expensive battery which would retain a low resistance at a very low temperature.

What is claimed is:

1. System for monitoring the pressure of a tyre of a vehicle wheel comprising a pressure sensor, a transmitter which transmits pressure data, a power-supply battery, a temperature sensor and a processor, the system being characterised in that the transmission of the pressure data is controlled by the processor according to the temperature, below a predetermined temperature threshold.

2. System according to claim 1, wherein a capacitor is mounted in parallel with the power-supply battery in order to ensure the power supply for the transmitter during the transmission periods and to be recharged outside these transmission periods.

3. System according to claim 1, wherein the pressure data being transmitted by series of identical bursts and the system being activated at regular intervals, the processor is arranged in order, below a temperature threshold, to spread the transmission of the bursts of a series over a number of activation intervals.

4. System according to claim 3, wherein the processor controls the transmission of one burst per activation interval.

5. System according to claim 1, wherein the battery the capacitor, the sensors, the processor and the transmitter are mounted in parallel.

* * * * *